United States Patent
Kaneda et al.

[19]

[11] Patent Number: 6,091,900
[45] Date of Patent: *Jul. 18, 2000

[54] LENS BARREL AND IMAGE PICKUP APPARATUS

[75] Inventors: Naoya Kaneda, Chigasaki; Tadanori Okada, Yokohama, both of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/059,922

[22] Filed: Apr. 14, 1998

[30] Foreign Application Priority Data

Apr. 18, 1997 [JP] Japan .................................. 9-101498

[51] Int. Cl.[7] .................................................. G03B 17/00
[52] U.S. Cl. .......................................... 396/55; 348/208
[58] Field of Search ........................... 396/55, 79, 508, 396/85, 87; 348/208, 345, 347, 357, 358, 362, 363; 359/554, 557

[56] References Cited

U.S. PATENT DOCUMENTS

| | | | |
|---|---|---|---|
| 5,266,988 | 11/1993 | Washisu | 396/55 |
| 5,717,960 | 2/1998 | Tomita et al. | 396/55 |
| 5,835,799 | 11/1998 | Washisu | 396/55 |
| 5,854,947 | 12/1998 | Imura | 396/55 |

*Primary Examiner*—W. B. Perkey
*Attorney, Agent, or Firm*—Robin, Blecker & Daley

[57] ABSTRACT

A lens barrel and an image pickup apparatus using the same are disclosed. The lens barrel includes a guide bar which guides a first lens unit in a direction of an optical axis, a shift unit which shifts a second lens in a direction perpendicular to the optical axis, and a recess portion which is formed in a member which constitutes part of the shift unit, in such a manner as to recede in the direction perpendicular to the optical axis, the guide bar being passed through the recess portion. The guide bar is disposed at a position as close to the optical axis as possible so that the size of the lens barrel is reduced.

17 Claims, 12 Drawing Sheets

LENS BARREL AND IMAGE PICKUP APPARATUS

BACKGROUND OF THE INVENTION

1. Field of the Invention

The present invention relates to a lens barrel having an image-shake correction function, which is used in an image pickup apparatus or the like, and more particularly to a zoom lens barrel having an image-shake correction function, which is used in an image pickup apparatus such as a video camera or a digital still camera which performs recording of a moving image and a still image by using a solid-state image pickup element such as a CCD.

2. Description of Related Art

Image pickup apparatus of the type in which a solid-state image pickup element such as a CCD is disposed in an image forming plane have been widely used as video cameras, digital still cameras or the like. In general, the larger the number of pixels per image pickup element such as a CCD used in such image pickup apparatus, the larger the size of the image pickup element and the higher the cost of the same. In terms of these considerations, numerous image pickup apparatus for general domestic use employ a so-called ¼-inch size CCD whose diagonal length is approximately 4 mm or a so-called ⅓-inch size CCD whose diagonal length is approximately 6 mm. These CCDs generally have 300,000 to 400,000 pixels.

Since the image size of such image pickup apparatus is small compared to the diagonal length, 43 mm, of the image size of a silver-halide camera using a so-called 135 film, it is possible to greatly reduce the size of a lens for the image pickup apparatus compared to the lens of the silver-halide camera if both lenses have the same angle of view. In practice, video cameras using ¼-inch size CCDs are in general provided with zoom lenses having a zoom ratio of 10 and an overall length of approximately 50 mm.

However, if such a zoom lens is mounted to a video camera or a digital still camera having a small size and a light weight, there is the problem that it is difficult for a photographer to obtain a stable image owing to a vibration of a hand applied to the image pickup apparatus, particularly if the photographer performs photography with the focal length of the image pickup apparatus being set to a comparatively long focal length side. To obtain a stable image, various image-shake preventing systems have heretofore been proposed. This kind of image-shake preventing system is capable of not only eliminating a harmful image shake due to a vibration of a hand applied to the image pickup apparatus, but also producing a great image-shake correction effect even in a situation in which no harmful image shake can be easily eliminated even with a tripod, for example, when photography is being performed on a travelling vessel or vehicle.

This kind of image-shake preventing system at least includes vibration detecting means for detecting a vibration and image-shake correction means for performing a predetermined correction to prevent occurrence of an image shake, according to information about the detected vibration. An angular-acceleration detector, an angular-velocity detector, an angular-displacement detector and the like are known as the vibration detecting means.

Optical correction means and electronic correction means are known as the image-shake correction means. The optical correction means is arranged to bend a photographing optical axis by using a variable angle prism or by shifting part of a photographing optical system in a plane perpendicular to the photographing optical axis (in a direction perpendicular to the photographing optical axis), while the electronic correction means is arranged to sequentially shift, each time an image shake occurs, a cutout position at which to cut out a particular area to be actually used as a picture toward a position at which the image shake can be corrected, in a video camera arranged to cut out such particular area from obtained picked-up image information. However, the latter image-shake correction means can provide a method of correcting continuous images in a moving image, but does not at all function as still-image correction means.

In general, the optical correction means is capable of effecting an image-shake correction for a vibration of not greater than an angle determined as an image-shake correction angle of a camera, irrespective of the focal length of a lens. Accordingly, the optical correction means is capable of realizing the performance of eliminating an image shake to a practically sufficient extent even if the zoom lens of the camera is set to a long focal length, i.e., a telephoto side (a long focal length side).

FIGS. 9(A), 9(B) and 9(C) are views illustrating the relation between the focal length and the vibration angle of a camera in the form of the position of a subject in a picture. Referring to FIG. 9(A), if the camera is placed at the position indicated by 112, the optical axis of the lens of the camera extends along a line 113 and an image of the face of a person 111 who is a subject is picked up approximately in the center of the picture. If the camera is rotated from this state through an angle of "a" degrees owing to a vibration, the position of the camera becomes as shown by 114 and the position of the optical axis becomes as shown by 115.

FIGS. 9(B) and 9(C) respectively show the positions of the subject in the picture when the camera is at the positions 112 and 114. FIG. 9(B) shows the state of the picture obtained when the zoom lens is set to its wide-angle end (the end of its short focal length side), and FIG. 9(C) shows the state of the picture obtained when the zoom lens is set to its telephoto end (the end of its long focal length side). In FIGS. 9(B) and 9(C), reference numeral 116 denotes the subject viewed in the picture, reference numerals 117 and 119 denote the pictures obtained when the camera is at the position 112, and reference numerals 118 and 120 denote the pictures obtained when the camera is at the position 114.

As can be seen from FIGS. 9(A), 9(B) and 9(C), even if the vibration angle of the camera is the same "a" degrees, it is natural that as the focal length of the zoom lens becomes longer, a more harmful image shake occurs in the picture. Accordingly, the optical correction means is more remarkably effective when it is combined with a zoom lens having a longer focal length on its telephoto side.

FIGS. 10(A), 10(B), 10(C), 11(A), 11(B), 12 and 13 show an arrangement using a variable angle prism, as one example of image-shake correction means. FIGS. 10(A)–10(C) show the arrangement of the variable angle prism itself. In FIG. 10(A), reference numerals 121 and 123 denote glass plates, and reference numeral 127 denotes a bellows part made of a material such as polyethylene. A transparent liquid 122 such as silicone oil is enclosed in the portion surrounded by the glass plates 121 and 123 and the bellows part 127.

Referring to FIG. 10(B), the two glass plates 121 and 123 are disposed in parallel with each other, and the angle at which a ray 125 enters the variable angle prism is equal to the angle at which the ray 125 exits from the variable angle prism. In contrast, if the two glass plates 121 and 123 make a particular angle such as that shown in FIG. 10(A) or 10(C), the passing ray is bent with a particular angle, like either of the rays 124 and 126 shown in FIGS. 10(A) and 10(C). Accordingly, it is possible to eliminate an image shake by controlling the apex angle of the variable angle prism which is disposed in front of a lens, so that the passing ray can be bent by an amount equivalent to an angle at which a camera is tilted by a cause such as a vibration of a hand which holds the camera.

FIGS. 11(A) and 11(B) schematically show the effect of the above-described control for ease of understanding. FIG. 11(A) shows the state in which the variable angle prism is placed in its parallel state and the ray propagates straightforwardly toward the head of the subject. If the ray is bent by driving the variable angle prism by an amount equivalent to a vibration of an angle of "a" degrees, as shown in FIG. 11(B), the photographing optical axis can be kept coincident with the head of the subject.

FIG. 12 is a schematic view showing an actual arrangement example of a variable angle prism unit including the aforesaid variable angle prism, an actuator part for driving the variable angle prism, and an apex-angle sensor for detecting the angular state of the variable angle prism.

Since actual vibrations occur in all directions, the variable angle prism is arranged in such a manner that its front and rear glass surfaces are rotatable about their rotating axes which differ 90 degrees from each other. In FIG. 27, reference numerals having affixed characters "a" denote constituent elements which are provided for producing rotations about one of the two rotating axes, while reference numerals having affixed characters "b" denote constituent elements which are provided for producing rotations about the other rotating axis. The constituent elements indicated by identical reference numerals (excluding the affixed characters "a" and "b") have completely the same function. For this reason, the following description is made using the reference numerals with the respective affixed characters "a" and "b" being omitted therefrom. The constituent elements arranged on the "b" side are partially not shown.

As shown in FIG. 12, a variable angle prism 141 includes the glass plates 121 and 123, the bellows part 127, a liquid enclosed in the bellows part 127, and other associated elements. The glass plates 121 and 123 are integrally attached to corresponding holding frames 128, as by an adhesive. The respective holding frames 128 constitute rotating axes 133 in combination with corresponding fixed components which are not shown, and are rotatable about their rotating axes 133. The directions of the rotating axes 133a and 133b differ 90 degrees from each other. Coils 135 are integrally provided on the respective holding frames 128, and magnets 136 and yokes 137 and 138 are provided on a fixed portion which is not shown.

In such an arrangement, if current is made to flow through either of the coils 135, the variable angle prism 141 rotates about the corresponding one of the rotating axes 133. A slit 129 is provided at the extending end of an arm portion 130 which integrally extends from the holding frame 128, and an apex-angle sensor for detecting the angular state of the variable angle prism 141 is formed by the slit 129 as well as a light emitting element 131 such as an iRED and a light receiving element 142 such as a PSD, both of which are provided on the fixed portion.

FIG. 13 is a block diagram showing an arrangement in which a lens is combined with an image-shake correction apparatus provided with the variable angle prism 141.

The arrangement shown in FIG. 13 includes the variable angle prism 141, apex-angle sensors 143 and 144, amplification circuits 153 and 154 for amplifying the outputs of the respective apex-angle sensors 143 and 144, a microcomputer 145, vibration detecting means 146 and 147 each of which is formed by an angular-acceleration sensor or the like, actuators 148 and 149 each of which is made up of the coil 135, the yoke 138 and the like, and a lens 152.

The microcomputer 145 determines currents to be supplied to the respective actuators 148 and 149, to control the variable angle prism 141 to place it into an angular state optimum for elimination of an image shake in a picture, according to the angular states of the variable angle prism 141 detected by the respective apex-angle sensors 143 and 144 and detection results provided by the respective vibration detecting means 146 and 147. Incidentally, the major elements shown in FIG. 13 are each prepared as a pair of blocks so that control operations for two directions which differ 90 degrees differ from each other can be independently performed.

The arrangement described above is merely one example, and any of the aforementioned kinds of sensors may be used as the vibration detecting means. Although an optical type of sensor using a light emitting element and a light receiving element has been referred to above as a sensor for detecting the apex angle of the variable angle prism, it is also possible to adopt a method of measuring a positional relation between a magnet and a coil by using a magnetic sensor such as a Hall element.

The amplification circuits for amplifying the outputs of the respective apex-angle sensors, which have been described above with reference to FIG. 13, may also be omitted according to the type of sensor. In addition, although the above description has referred to a method of correcting an image shake in an arbitrary direction by rotating two glass plates, which constitute a variable angle prism, about rotating axes which differ 90 degrees from each other, an arrangement for driving one glass plate in an arbitrary direction is also proposed in Japanese Laid-Open Patent Application No. Hei 8-43769 and others.

In such a zoom lens barrel having the image-shake correction means using such a variable angle prism, it is necessary to dispose a large unit in front of a zoom lens (on a subject side) as the variable angle prism, because the diameter of the variable angle prism needs to be determined so that an effective ray on a wide-angle side of the zoom lens is not shaded. This requirement is a hindrance to a further reduction in the entire size of an image pickup apparatus. To solve this problem, the art of disposing a variable angle prism element in the inside of a lens is also proposed. However, in this art as well, since the variable angle prism element which does not directly participate in an image forming operation must be disposed in a photographing lens, the entire optical length of the entire lens can only be reduced to a limited extent, so that it is impossible to avoid an increase in the entire size of an image pickup apparatus.

Similarly, in the field of a zoom lens barrel having no image-shake correction means, a reduction in size is an important problem. FIGS. 14(A) and 14(B) show one example of the aforesaid type of zoom lens barrel, and FIG. 14(A) is a longitudinal sectional view of the zoom lens barrel, while FIG. 14(B) is a longitudinal sectional view taken along line A—A of FIG. 14(A). In the zoom lens barrel shown in FIGS. 14(A) and 14(B), four lens groups 201a to 201d constitute a photographing zoom lens, and the lens group 201a is provided as a fixed front lens, the lens group 201b is provided as a variator lens group which moves along an optical axis 205 to effect a magnification varying operation, the lens group 201c is provided as a fixed afocal lens, and the lens group 201d is provided as a focusing lens group which moves along the optical axis 205 to maintain the position of a focal plane and effect a focusing operation during a magnification varying operation. Reference numerals 203, 204a and 204b denote guide bars which are disposed in parallel with the optical axis 205 to guide the movable lens groups while preventing rotation thereof during their movements.

A DC motor 206 serves as a drive source for moving the variator lens group 201b. The DC motor 206 may also be replaced with a stepping motor or the like. The variator lens group 201b is held by a holding frame 211. The holding frame 211 has a pressure spring 209 and a ball 210 which is pressed in engagement with a screw groove 208a formed around a screw rod 208, by the force of the pressure spring 209. In this arrangement, if the screw rod 208 is rotationally driven by the DC motor 206 through an output shaft 206a and a gear train 207, the holding frame 211 is moved along the guide bar 203 in the direction of the optical axis 205.

In FIG. 14(B), reference numeral 212 denotes a stepping motor. The focusing lens group 201d is held by a holding frame 214. A screw member 213 is integrally secured to a sleeve portion 214a of the holding frame 214, and is screwed onto an externally threaded portion of an output shaft 212a of the stepping motor 212. In this arrangement, the holding frame 214 can be moved along the guide bars 204a and 204b in the direction of the optical axis 205 by the rotation of the stepping motor 212.

In FIG. 14(B), reference numeral 218 denotes an IG meter which drives an iris unit, and reference numeral 220 denotes a camera body to which the zoom lens barrel is secured.

As described above, even the zoom lens barrel having no image-shake correction means needs three actuators, i.e., an IG meter for driving an iris, a zooming motor for driving a variator lens group, and a focusing motor for driving a focusing lens. To reduce the size of the zoom lens barrel, it is important to consider how efficiently and compactly these actuators are to be laid out.

As is apparent from the above description, the zoom lens using the aforesaid variable angle prism has the problem that the size and the weight of the entire lens barrel can only be reduced to a limited extent. In contrast, a zoom lens which has a so-called shift type of image-shake correction means for correcting an image shake by moving a predetermined lens group in a plane perpendicular to the optical axis of the zoom lens is disclosed in Japanese Patent No. 2560377 and others. In the zoom lens having this shift type of image-shake correction means, the lens group required to focus an image can also be used as a shift lens for the image-shake correction means. Therefore, such zoom lens is advantageous in terms of further reductions in the entire length, size and weight, as compared with at least the system using the aforesaid variable angle prism.

However, in an actual lens barrel, actuators such as an IG meter for driving an iris, a zoom motor and a focusing motor are indispensable, and it is, therefore, necessary to reduce the sizes and the weights of these actuators if the entire lens barrel is to be reduced in size and weight.

BRIEF SUMMARY OF THE INVENTION

An object of the present invention is to provide a lens barrel which includes a shift type of image-shake correction means in a built-in form and which can be reduced in size and weight, together with indispensable constituent elements, and an image pickup apparatus provided with such lens barrel.

To achieve the above object, in accordance with a first aspect of the present invention, there is provided a lens barrel which comprises a guide bar which guides a first lens unit in a direction of an optical axis, a shift unit which shifts a second lens in a direction perpendicular to the optical axis, and a recess portion which is formed in a member which constitutes part of the shift unit, in such a manner as to recede in the direction perpendicular to the optical axis, the guide bar being passed through the recess portion.

In the first aspect, the guide bar is disposed at a position as close to the optical axis as possible so that the radial size of the lens barrel can be reduced.

In accordance with a second aspect of the present invention, there is provided a lens barrel which comprises a movable member which moves while holding a lens, and a fixed member which is fixed to a lens barrel body and holds the movable member for movement in a direction perpendicular to an optical axis, holding positions at which the movable member are held being provided in the fixed member at three or more locations spaced at intervals of an equal angle about the optical axis, and an actuator being disposed in an area other than the holding positions as viewed in the direction of the optical axis.

In the second aspect of the present invention, it is possible to hold the movable member uniformly and with high accuracy by, for example, holding portions which are disposed in the fixed member at intervals of approximately 120 degrees about the optical axis. In addition, it is possible to realize an efficient layout in the lens barrel by disposing any of a movable-member driving actuator, an iris driving actuator, a variator-lens-unit driving actuator and a focusing-lens-unit driving actuator in an area other than the holding portions.

In accordance with a third aspect of the present invention, there is provided a lens barrel which comprises a rack member which is secured to a first lens and which meshes with a screw shaft extending in a direction of an optical axis and generates a driving force in the direction of the optical axis, a shift unit which moves a second lens in a direction perpendicular to the optical axis, and a recess portion which is formed in a member which constitutes part of the shift unit, in such a manner as to recede in the direction perpendicular to the optical axis, a meshing portion of the rack member being positioned in the recess portion as viewed in the direction of the optical axis.

In the third aspect of the present invention, the rack member (the meshing portion) secured to the first lens can be disposed at a position as close to the optical axis as possible, whereby the radial size of the lens barrel can be reduced. In addition, when the rack member moves closer to the shift unit, the rack member can mesh with the screw shaft over a long range in the direction of the optical axis without interfering with the shift unit.

In accordance with a fourth aspect of the present invention, there is provided a lens barrel which comprises a first lens which moves in a direction of an optical axis, a shift unit which moves a second lens in a direction perpendicular to the optical axis, and a projecting portion (for example, light blocking means which blocks detection light for detecting a moving position of the first lens) formed on a holding member for the first lens at a position opposed to the shift unit in the direction of the optical axis, in such a manner as to project in the direction of the optical axis, a hole portion into which the projecting portion is inserted being formed in the shift unit.

In the fourth aspect of the present invention, when the movable lens moves closer to the shift unit, the projecting portion which projects from the first lens toward the shift unit is inserted into the hole portion so that the projecting portion is prevented from interfering with the shift unit. Accordingly, the moving end of the first lens can be made close to the shift unit and a large magnification variation ratio and the like can be obtained even in a lens barrel of reduced size.

In accordance with a fifth aspect of the present invention, there is provided a lens barrel which comprises a shift unit which moves a lens in a direction perpendicular to an optical axis, the shift unit including an actuator which drives the lens, and position detecting means which detects a position of the lens. The actuator and the position detecting means are disposed at a position where the actuator and the position detecting means are at least partly superposed on each other as viewed in the direction of the optical axis.

In the fifth aspect of the present invention, the actuator and the position detecting means are aligned with each other in the direction of the optical axis, whereby the external diametrical size of the shift unit can be particularly reduced.

In accordance with a sixth aspect of the present invention, there is provided a lens barrel which comprises a shift unit which moves a lens in a direction perpendicular to an optical axis, the shift unit including a coil and a yoke for driving the lens by magnetic force, a detecting element for detecting a position of the lens, and a holding member which holds the detecting element, the holding member being secured to the yoke.

In the sixth aspect of the present invention, as in the fifth aspect of the present invention, since the actuator and the position detecting means are aligned with each other in the direction of the optical axis and the yoke disposed on the side of the position detecting means plays the role of a member which supports the holding member, the size of the shift unit can be reduced.

In accordance with a seventh aspect of the present invention, there is provided a lens barrel which comprises a first actuator which moves a first lens in a direction of an optical axis, a third actuator which drives an iris, and a second actuator which drives a second lens in a direction perpendicular to the optical axis, the first actuator and the third actuator being disposed in an area on a side of the optical axis opposite to an area in which the second actuator is disposed, as viewed in the direction of the optical axis, and the first actuator and the third actuator being disposed at a position where the first actuator and the third actuator are at least partly superposed on each other as viewed in the direction of the optical axis.

In the seventh aspect of the present invention, each of the actuators can be disposed in the lens barrel in an efficient and well-balanced manner, whereby the size of the lens barrel can be reduced.

In accordance with an eighth aspect of the present invention, there is provided a lens barrel which comprises a first actuator which moves a first lens in a direction of an optical axis, a third actuator which drives an iris, and a second actuator which drives a second lens in a direction perpendicular to the optical axis, the first actuator being disposed in an area on a side of the optical axis opposite to an area in which the second actuator is disposed, as viewed in the direction of the optical axis, the third actuator and the second actuator being disposed at a position where the third actuator and the second actuator are approximately superposed on each other as viewed in the direction of the optical axis, the first actuator being disposed forwardly from an image forming plane in the direction of the optical axis.

In the eighth aspect of the present invention, similarly to the arrangement according to the seventh aspect, the radial size of the lens barrel can be reduced, and since the position of the third actuator in the arrangement according to the seventh aspect is transferred to another position, the first actuator can be transferred forwardly in the direction of the optical axis so as not to project rearwardly from the image forming plane in the direction of the optical axis, whereby the size of the lens barrel in the direction of the optical axis can be reduced.

In the arrangement according to the eighth aspect, it is also possible to make the lens barrel thinner by disposing the first actuator at a position on a side of the optical axis opposite to a position in which the third actuator is disposed, as viewed in the direction of the optical axis.

The above and other objects, features and advantages of the present invention will become apparent from the following detailed description of preferred embodiments of the present invention, taken in conjunction with the accompanying drawings.

DETAILED DESCRIPTION OF THE INVENTION

Preferred embodiments of the present invention will be described below in detail with reference to the accompanying drawings.

Figure 1:
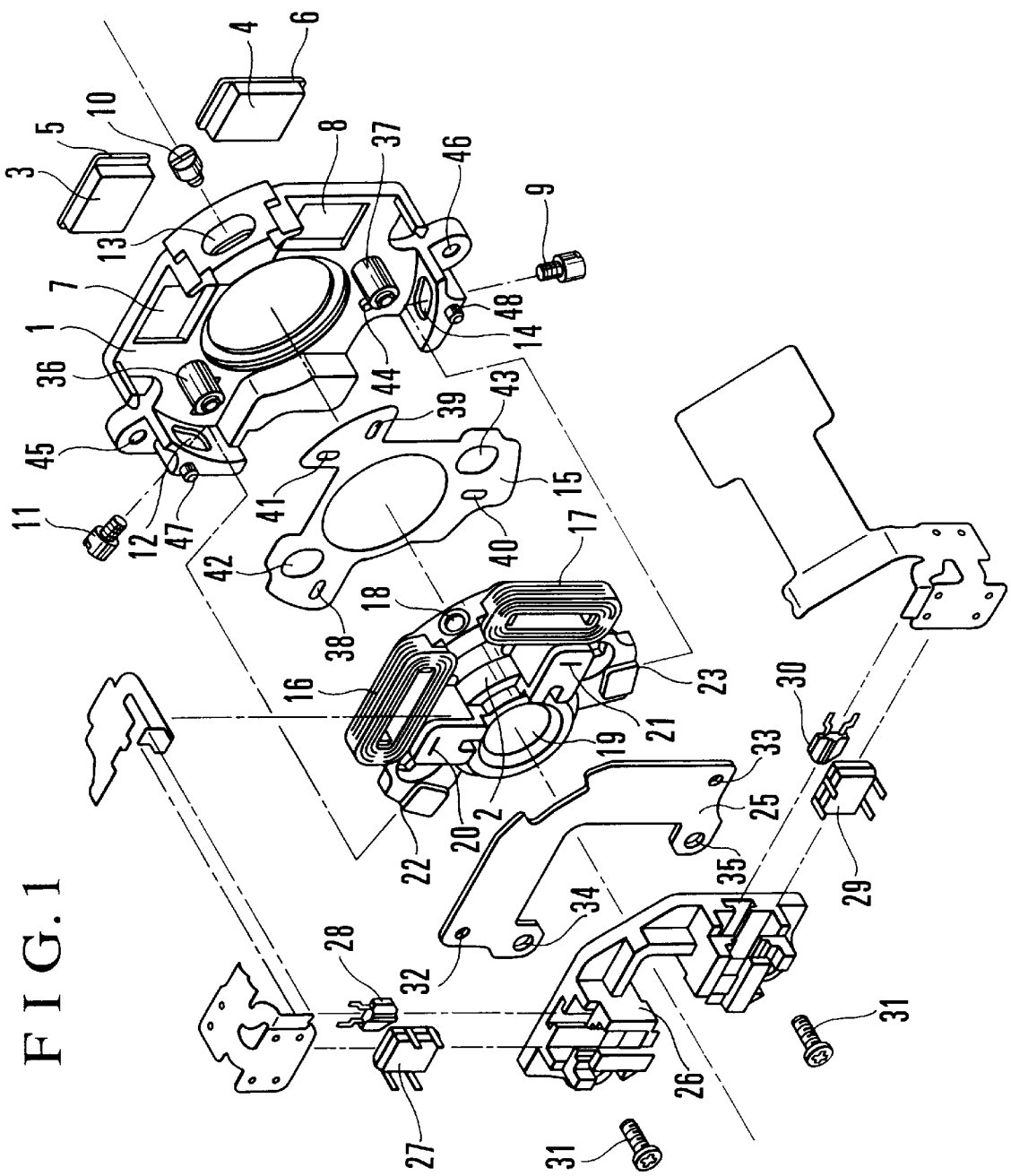
FIG. 1 is a diagrammatic exploded perspective view of a shift unit of a zoom lens barrel according to a first embodiment of the present invention.

FIG. 1 shows the construction of a shift unit which constitutes image-shake correction means in a zoom lens barrel according to a first embodiment of the present invention. In the shift unit shown in FIG. 1, a fixed frame (fixed member) 1 constitutes a base member for a shift mechanism, and is fixed in the zoom lens barrel. A movable frame (movable member) 2 is capable of making a shift movement with respect to the fixed frame 1 within a predetermined area in a plane perpendicular to the optical axis of the zoom lens barrel (in a direction perpendicular to the optical axis).

A magnet part 3 constitutes part of a shift actuator which drives the movable frame 2 in either of the upward and downward directions as viewed in FIG. 1, and is magnetized to have two opposite poles in its upper and lower portions, respectively. A magnet part 4 constitutes part of a shift actuator which drives the movable frame 2 in either of laterally opposite directions as viewed in FIG. 1, and is magnetized to have two laterally opposite poles. Lower yoke parts 5 and 6 are made of a material such as iron, and are fixed to the respective magnet parts 3 and 4 by magnetic force or by an adhesive, and positioning hole portions 7 and 8 are provided in the fixed frame 1 so as to fix the respective magnet parts 3 and 4 in position.

Machine screws 9, 10 and 11 are tightly fitted through hole portions 12, 13 and 14 of the fixed frame 1, respectively, and are fixedly screwed into screw holes 18, 22 and 23 of the movable frame 2, respectively.

An anti-rolling plate 15 serves to prevent the movable frame 2 from rolling about the optical axis. Slots 40 and 41 of the anti-rolling plate 15 are respectively fitted onto a boss 44 and a boss (not shown) which are provided on the fixed frame 1. Slots 38 and 39 are respectively fitted onto bosses (not shown) provided on the movable frame 2. Hole portions 42 and 43 are provided in the anti-rolling plate 15 so that bosses 36 and 37 integrally provided on the fixed frame 1 are respectively inserted through the hole portions 42 and 43. Each of the hole portions 42 and 43 is formed to have a size which can prevent the anti-rolling plate 15 and the bosses 36 and 37 from interfering with each other, even if the anti-rolling plate 15 is driven to move by a maximum amount.

A coil part 16 constitutes part of a moving-coil type shift actuator which is moved in either of the upward and downward directions as viewed in FIG. 1, and a coil part 17 constitutes part of a moving-coil type shift actuator which is moved in either of laterally opposite directions as viewed in FIG. 1. These coil parts 16 and 17 are integrally fixed to the movable frame 2 by an adhesive or the like. Slit portions 20 and 21 are integrally provided in the movable frame 2 for detecting the amount of shifting, and are respectively provided at the same positions as the coil parts 16 and 17 as viewed in the direction of the optical axis (i.e., in such a manner as to be aligned with the coil parts 16 and 17 in the direction of the optical axis). An upper yoke 25 is made of a material such as iron, similarly to the lower yokes 5 and 6. The magnet parts 3 and 4, the lower yokes 5 and 6 and the upper yoke 25 form a magnetic closed circuit. Accordingly, if currents flow through the coil parts 16 and 17 placed in the magnetic closed circuit, the movable frame 2 can be displaced with respect to the fixed frame 1 in a direction perpendicular to the optical axis. Reference numeral 19 denotes a tubular portion for enabling the movable frame 2 to hold a shift lens in position.

Reference numeral 26 denotes a sensor holder (holding member) 26 which holds sensors for detecting the amount of shifting of the movable frame 2. A light emitting element 28 and a light receiving element (such as a position sensor) 27 for detecting the amount of shifting in either of the upward and downward directions are fixed to the sensor holder 26 by an adhesive or the like, and a light emitting element 30 and a light receiving element 29 for detecting the amount of shifting in either of the laterally opposite directions are fixed to the sensor holder 26 by an adhesive or the like. If the respective slit portions 20 and 21 move between the light emitting element 28 and the light receiving element 27 and between the light emitting element 30 and the light receiving element 29, the position of the gravitational center of light received by the light receiving elements 27 and 29 varies and the amount of shifting of the movable frame 2 can be detected from this variation.

Machine screws 31 for fixing the sensor holder 26 and the upper yoke 25 to the fixed frame 1 are respectively screwed into internally threaded portions formed in the bosses 36 and 37 of the fixed frame 1. The upper yoke 25 is positioned with respect to the fixed frame 1 in such a way that hole portions 34 and 35 of the upper yoke 25 are respectively fitted onto the external peripheries of the extending ends of the bosses 36 and 37 of the fixed frame 1. The sensor holder 26 is positioned with respect to the upper yoke 25 in such a way that bosses (not shown) of the sensor holder 26 are respectively fitted into holes 32 and 33 of the upper yoke 25.

In this manner, the sensor holder 26 which holds the amount-of-shifting detecting elements is held on the upper yoke 25 which constitutes part of the shift actuators, whereby the required number of component parts of the shift unit can be reduced and the entire size of the shift unit can be reduced to a further extent.

Figure 2:
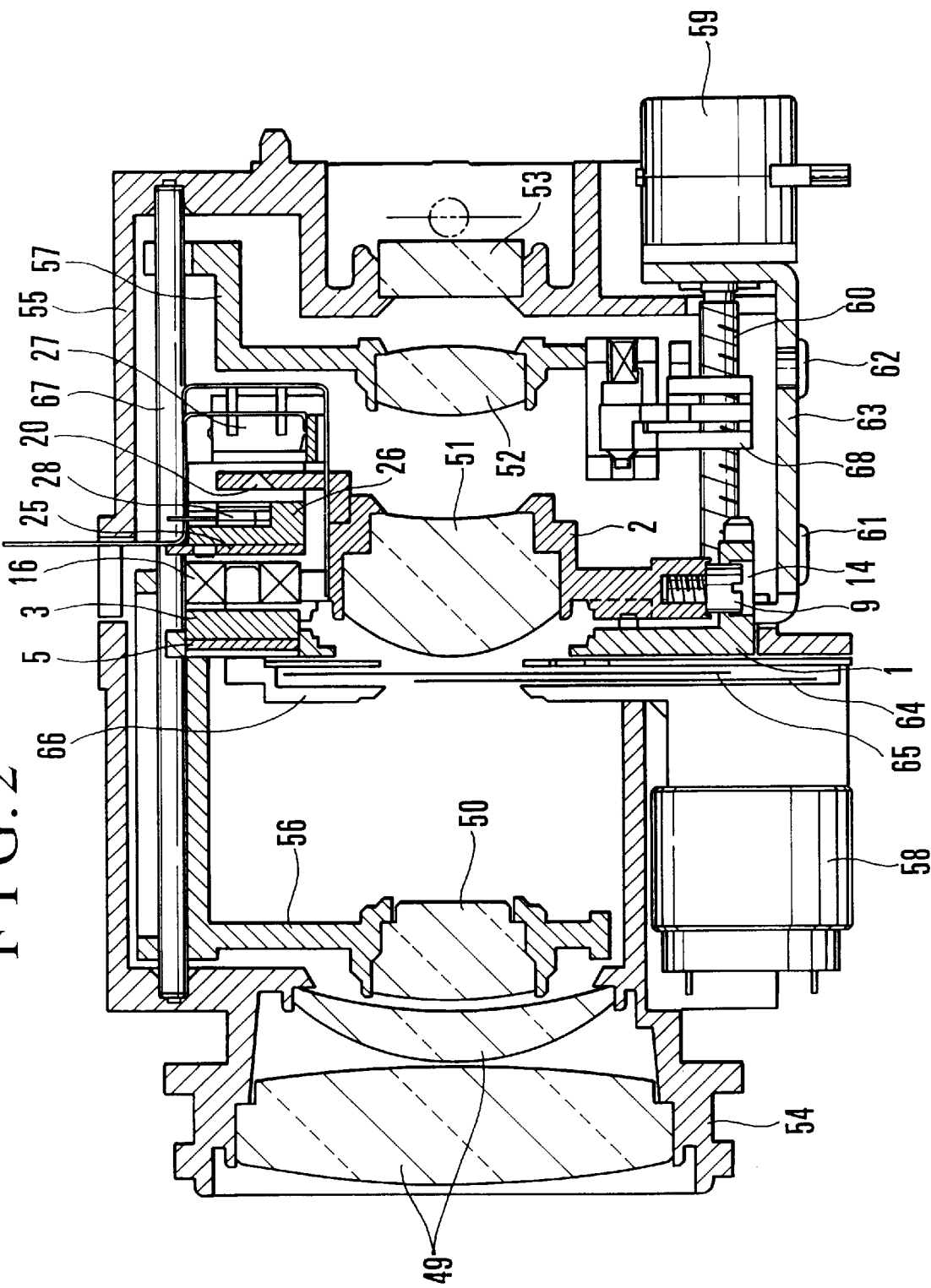
FIG. 2 is a diagrammatic cross-sectional view of the zoom lens barrel.

Hole portions 45 and 46 of the fixed frame 1 are disposed between, and fastened to, a fixed tube 54 and a rear tube 55 which constitute part of a lens barrel body, as shown in FIG. 2. In this manner, the entire shift unit is mounted in the zoom lens barrel. Positioning bosses 47 and 48 are respectively fitted into holes (not shown) formed in the fixed tube 54, to position the entire shift unit with respect to the fixed tube 54.

Figure 3:
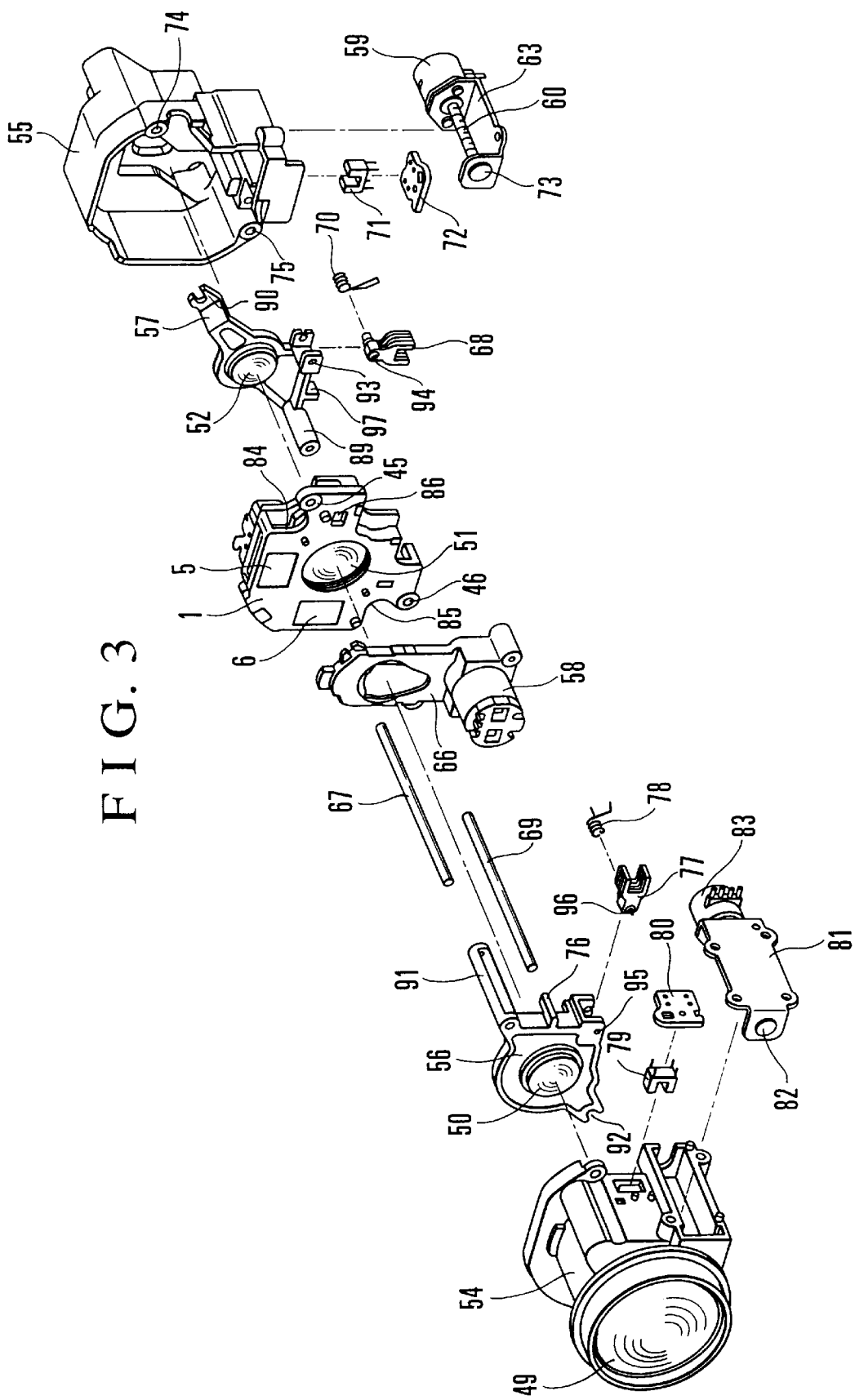
FIG. 3 is a diagrammatic exploded perspective view of the zoom lens barrel.

FIGS. 2 and 3 show a state in which the above-described shift unit is incorporated in an actual zoom lens barrel. The zoom lens barrel shown in FIGS. 2 and 3 includes a fixed front lens 49, a second lens (variator lens) 50 which moves along the optical axis of the zoom lens barrel to provide a magnification varying action, a third lens (shift lens) 51 included in the shift unit, which moves in a direction perpendicular to the optical axis to provide an image-shake correction function, a fourth lens (focusing lens) 52 which moves in the direction of the optical axis to perform the operation of maintaining the position of a focal plane during the magnification varying operation of the variator lens 50 and the operation of adjusting focus with respect to a variation in the distance to a subject, and a low-pass filter 53.

The zoom lens barrel also includes the fixed tube 54 which holds the front lens 49, the rear tube 55, a movable variator ring (movable lens unit) 56 which holds the variator lens 50, a movable focusing ring (movable lens unit) 57 which holds a focusing lens 52, an IG meter 58 which drives iris blades 64 and 65, an iris unit 66 having a case which accommodates the iris blades 64 and 65, and a guide bar 67 which is fitted through sleeve portions (refer to FIG. 5) provided in the movable variator ring 56 and the movable focusing ring 57, in such a manner as to be movable in the direction of the optical axis. Incidentally, as shown in FIG. 3, two guide bars are provided in parallel with the optical axis, and these two guide bars, i.e., the guide bar 67 and a guide bar 69, serve to guide the movable variator ring 56 and the movable focusing ring 57 in the direction of the optical axis and to prevent rotation of the movable variator ring 56 and the movable focusing ring 57 about the optical axis.

The zoom lens barrel also includes a focusing-driving stepping motor 59 having an output shaft 60 which is externally threaded. A motor holder 63 extends up to a bearing portion provided at the extending end of the output shaft 60, and this motor holder 63 is secured to the rear tube 55 by machine screws 61 and 62, whereby the motor 59 is fixed to the rear tube 55.

A rack member 68 is secured to the movable focusing ring 57 and is screwed onto the externally threaded portion of the output shaft 60. As shown in FIG. 3, a rack member 77 is secured to the movable variator ring 56, and the rack member 77 is screwed onto an externally threaded portion of an output shaft (not shown in FIG. 3) of a variator-driving stepping motor 83 secured to the fixed tube 54 via a motor holder 81.

The rack members 68 and 77 are respectively secured to the respective movable rings 57 and 56 in such a manner that shaft portions 94 and 96 are respectively fitted through holes 93 and 95 which are formed in the respective movable rings 57 and 56 to extend in the direction of the optical axis. The respective rack members 68 and 77 are swingable about the shaft portions 94 and 96 with respect to the movable rings 57 and 56. Accordingly, even if there is a deviation in the parallelism between the guide bars 67 and 69 and the output shafts of the motors 59 and 83, it is possible to ensure smooth movement of the movable rings 57 and 56. The meshing portions of the rack members 68 and 77 are respectively urged in one swinging direction by springs 70 and 78 to be pressed against the externally threaded portions of the respective motors 59 and 83. Accordingly, the respective meshing portions of the rack members 68 and 77 can be securely meshed with the externally threaded portions of the motors 59 and 83.

Figure 4:
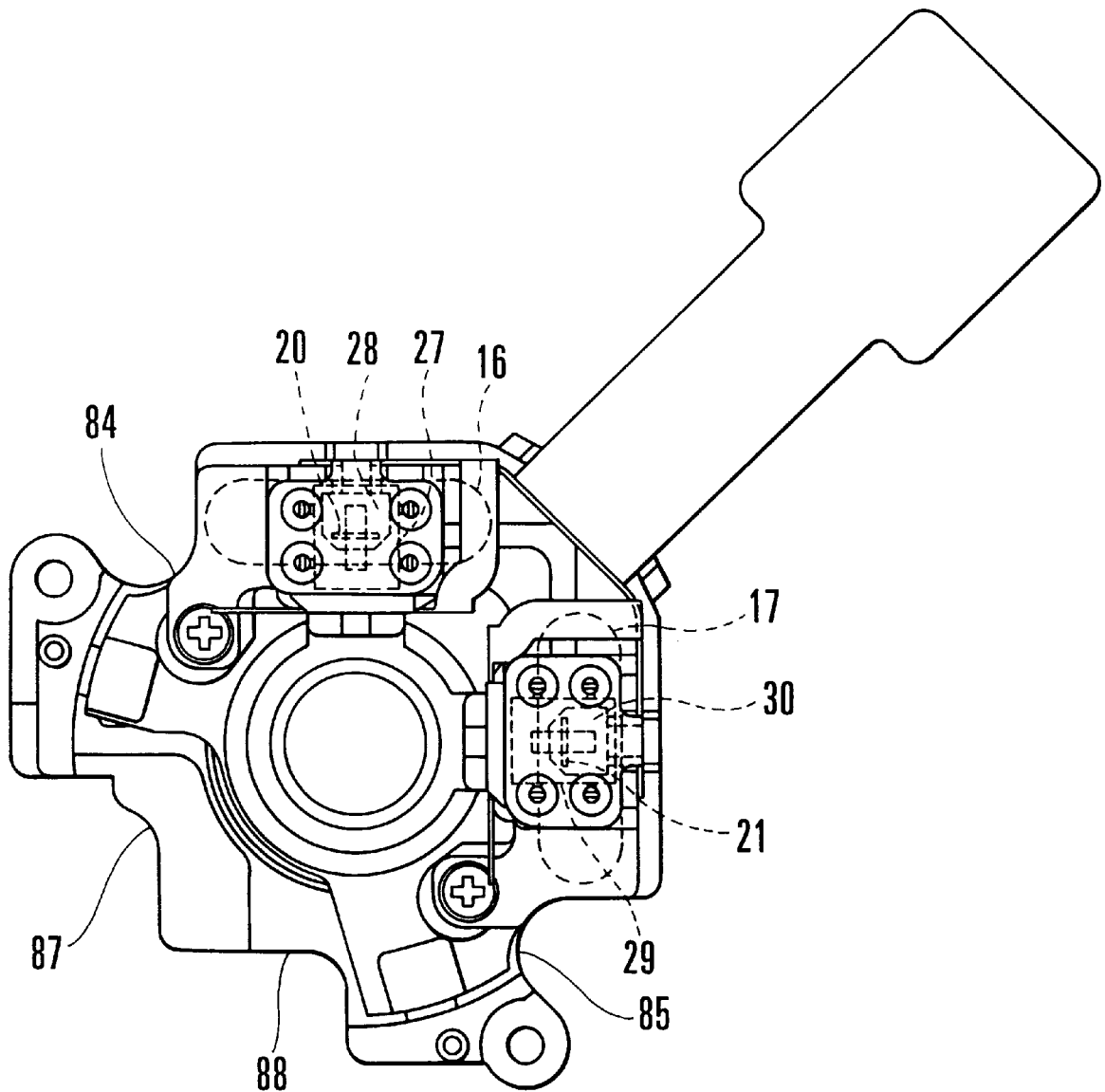
FIG. 4 is a diagrammatic view showing the shift unit as seen in the direction of the optical axis of the zoom lens barrel.
Figure 5:
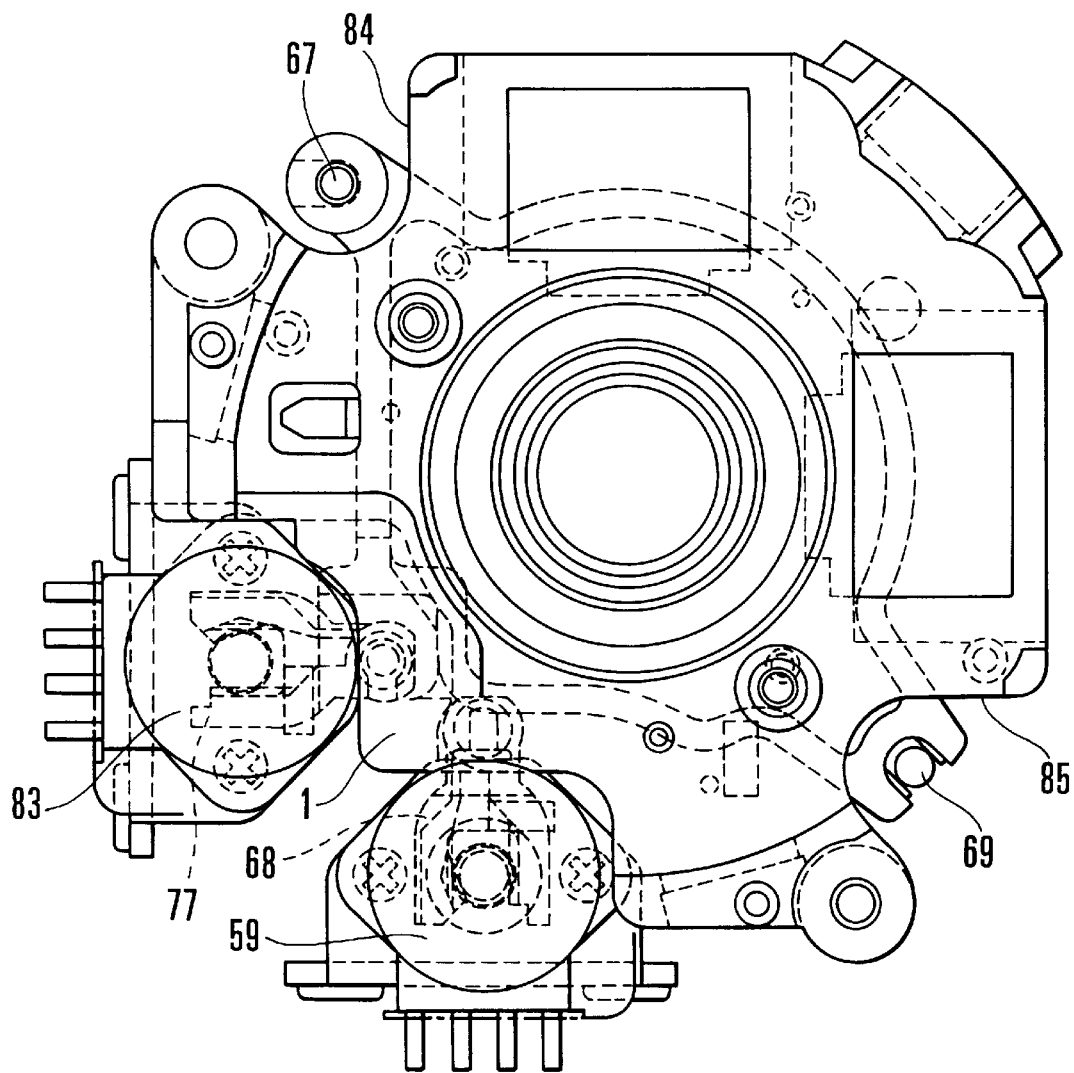
FIG. 5 is a diagrammatic view showing the zoom lens barrel as seen in the direction of the optical axis of the zoom lens barrel.

Since the guide bars 67 and 69 are disposed to extend between the fixed tube 54 and the rear tube 55, the positions of the guide bars 67 and 69 need to avoid the shift unit disposed between the fixed tube 54 and the rear tube 55. For this reason, in the first embodiment, as shown in FIGS. 4 and 5, recess portions 84 and 85 which are formed to recede in the direction perpendicular to the optical axis are provided in the fixed frame 1 of the shift unit, and the respective guide bars 67 and 69 are disposed to extend through the recess portions 84 and 85. According to this arrangement, the guide bars 67 and 69 can be disposed at a position as close to the optical axis as possible, whereby the radial size of the zoom lens barrel can be reduced to a further extent.

In the first embodiment, the machine screws 9, 10 and 11 shown in FIG. 1 (and the screw holes 18, 22 and 23 of the movable frame 2 into which the respective machine screws 10, 11 and 9 are fitted) are disposed in such a well-balanced manner as to be equally spaced apart at intervals of 120 degrees around the optical axis. In addition, the shift actuator which includes the magnet part 3 and the coil part 16 which extends in the lateral direction in an upper portion of the zoom lens barrel, and the shift actuator which includes the magnet part 4 and the coil part 17 which extends in the vertical direction in a side portion of the zoom lens barrel, are respectively disposed between the machine screws 10 and 11 and between the machine screws 9 and 10. According to this arrangement, the three machine screws 9, 10 and 11 and the two shift actuators can be disposed at positions close to the optical axis without interfering with each other, whereby the radial size of the zoom lens barrel can be effectively reduced.

Furthermore, as shown in FIG. 5, the focusing-driving stepping motor 59 and the variator-driving stepping motor 83 are respectively disposed at positions which do not overlap any of the areas in which the machine screws 9, 10 and 11 and the shift actuators are respectively disposed, as viewed in the direction of the optical axis. In addition, as shown in FIG. 4, recess portions 87 and 88 which are formed to recede in the direction perpendicular to the optical axis are provided in the fixed frame 1 of the shift unit, and the variator-driving stepping motor 83 and the focusing-driving stepping motor 59 are disposed so that the meshing portions of the rack members 77 and 68 are respectively positioned in the recess portions 87 and 88, as viewed in the direction of the optical axis. According to this arrangement, the stepping motors 59 and 83 can be disposed close to the optical axis, whereby the radial size of the zoom lens barrel can be reduced to a further extent. In addition, even if the movable rings 57 and 56 move closer to the shift unit, the rack members 68 and 77 do not interfere with the shift unit, whereby it is possible to sufficiently ensure the lengths of the rack members 68 and 77 in the direction of the optical axis (the lengths with which the rack members 68 and 77 mesh with the output shafts of the motors 59 and 83) and it is possible to achieve secure and stable lens driving even in a reduced zoom lens barrel.

Figure 6A:
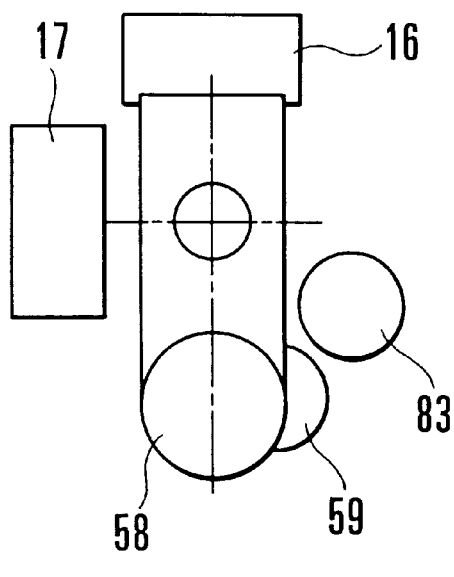
FIGS. 6(A) and 6(B) are layout views of actuators of the zoom lens barrel.

As shown in FIG. 6(A), the focusing-driving stepping motor 59 and the variator-driving stepping motor 83 along with the IG meter 58 are disposed in an area on the side of the optical axis opposite to the area in which the shift actuators are disposed, as viewed in the direction of the optical axis. According to this arrangement, it is possible to dispose the actuators in a compact and well-balanced manner, as viewed in the direction of the optical axis, whereby the entire zoom lens barrel can be effectively reduced.

As described previously, the coil part 16 and the magnet part 3 constitute the shift actuator for preventing an image shake in the vertical direction, while the coil part 17 and the magnet part 4 constitute the shift actuator for preventing an image shake in the horizontal direction. In this manner, in an image shake preventing device, it is generally possible to correct an image shake in two directions, the vertical direction and the horizontal direction (as a result, an image shake in an arbitrary direction can be prevented owing to a composite angle). In addition, in an arrangement which uses an iris unit of the type in which two blades are moved along the same rail in opposite directions to control the shape of an opening, or in an arrangement in which a method generally used in this kind of camera, i.e., a method of detecting the sharpness of a blur of a television signal, is used as an automatic focus adjusting device, it is desirable that the opening of the iris has a rhomboidal shape which is wider in a direction parallel to scanning lines. From these facts, it is general that, as viewed in the direction of the optical axis, the IG meter 58 is disposed at the same position as the coil part 16 and the magnet part 3 or at a position on the side of the optical axis opposite to the coil part 16 and the magnet part 3. For this reason, in the first embodiment, the IG meter 58 is disposed on the side of the optical axis opposite to the coil part 16 and the magnet part 3.

Figure 6B:
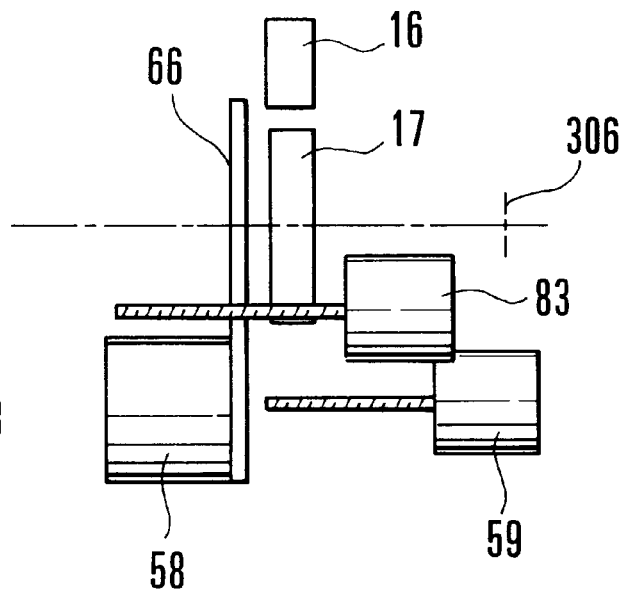

The output shaft of the variator-driving stepping motor 83 is longer than that of the focusing-driving stepping motor 59, and the dimension from the front end of the output shaft to the rear end of the body of the motor 83 is longer than the length of from the iris unit 66 to the front lens 49 or the length of from the iris unit 66 to an image forming plane (306 in FIG. 6(B)). This is because the entire moving distance of the variator lens is in general longer than the entire moving distance of the focusing lens. Accordingly, as shown in FIG. 6(A), the variator-driving stepping motor 83 is disposed at a position which does not overlap the IG meter 58, as viewed in the direction of the optical axis.

As is apparent from FIG. 2 as well, even if the stepping motor 59 is disposed behind the iris unit 66, the rear end of the stepping motor 59 only projects rearwardly from the image forming plane 306 by a slight amount which substantially does not cause a problem in practical use. Accordingly, the above-described actuator arrangement is optimum for making the entire zoom lens barrel compact.

As shown in FIG. 4, in the zoom lens barrel according to the first embodiment, in the direction of the optical axis, the two shift actuators and amount-of-shifting detecting means (the slit portions 20 and 21, the light emitting elements 28 and 30 and the light receiving elements 27 and 29) are disposed approximately at the same position. This arrangement is also intended to reduce the radial size of the zoom lens barrel to a further extent.

As shown in FIG. 3, the movable variator ring 56 is integrally provided with a light blocking wall portion (projecting portion) 76. The light blocking wall portion 76 is arranged to be inserted between the light emitting element and the light receiving element of a photointerrupter 79 mounted in the fixed tube 54 through a hole portion of the fixed tube 54, when the movable variator ring 56 is moving within approximately a front (subject side) half of its entire moving range. When the movable variator ring 56 is moving in this front half range, the light emitted from the light emitting element is blocked by the light blocking wall portion 76 and does not reach the light receiving element. On the other hand, when the movable variator ring 56 is moving within approximately a rear (image-plane side) half, the light blocking wall portion 76 is not inserted between the light emitting element and the light receiving element and the light receiving element receives the light emitted from the light emitting element and generates a predetermined output.

Accordingly, if one threshold indicative of a transfer from a light-blocked state to a light-unblocked state is set for the output of the light receiving element, the position of the movable variator ring 56 for which an output of this threshold can be obtained from the light receiving element is primarily determined. If the position for which the output of the threshold is generated is set as a reference position and the number of drive pulses is continuously counted from the reference position, it is possible to know an absolute position of the variator lens 50 in the direction of the optical axis. Incidentally, a circuit board 80 on which the photointerrupter 79 is mounted is fixed to the fixed tube 54 in position.

In the arrangement in which the aforesaid light blocking wall portion 76 is provided, it is necessary to set the length of the light blocking wall portion 76 in the direction of the optical axis to a length equal to or greater than half of the moving range of the movable variator ring 56 so that the reference position can be set approximately in the middle of the moving range of the movable variator ring 56. In this arrangement, when a constituent element which is associated with the layout of the photointerrupter 79, for example, the movable variator ring 56 is located at one end position during the light-unblocked state (the movable variator ring 56 is located at a position closest to the iris unit 66, generally, at one end on the long focal length side), the light blocking wall portion 76 is moved to the rear side of the iris unit 66. Unlike a conventional zoom lens barrel having no shift unit in which a light blocking wall portion is disposed so as not to avoid an iris unit, in the zoom lens barrel having the shift unit according to the first embodiment, it is necessary to prevent interference between the light blocking wall portion 76 and the shift unit.

In the first embodiment, since a hole portion 86 is provided in the fixed frame 1 of the shift unit and the light blocking wall portion 76 is inserted through the hole portion 86 so that the interference between the light blocking wall portion 76 and the shift unit can be prevented, the moving end of the movable variator ring 56 can be made close to the shift unit.

Incidentally, although the arrangement for determining the reference position is provided on the side of the variator lens 50, a similar arrangement is also provided on the side of the focusing lens 52. As shown in FIG. 3, a light blocking wall portion 97 is integrally provided on the movable focusing ring 57, and a photointerrupter 71 is mounted on a circuit board 72 which is fixed to the rear tube 55 in position.

Figure 7A:
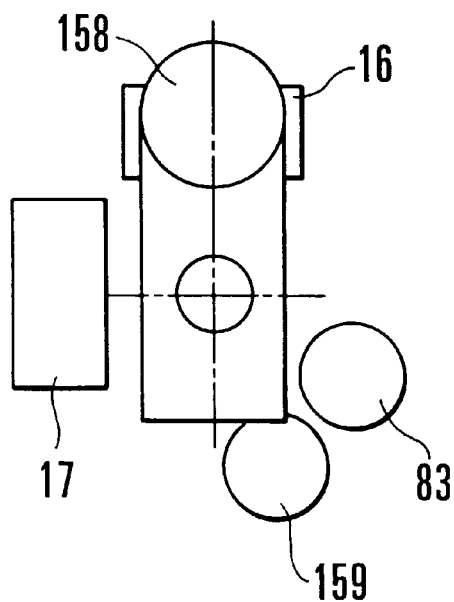
FIGS. 7(A) and 7(B) are layout views of actuators of a zoom lens barrel according to a second embodiment of the present invention.
Figure 7B:
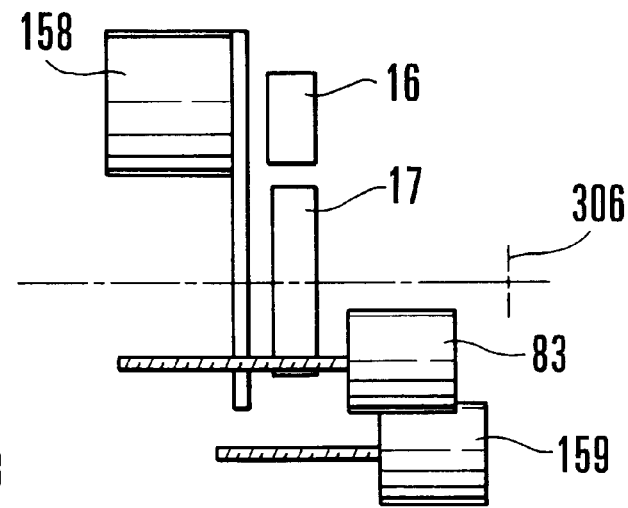

FIGS. 7(A) and 7(B) show a zoom lens barrel according to a second embodiment of the present invention. Incidentally, since the basic arrangement of the second embodiment is common to that of the first embodiment, common reference numerals are used to denote constituent elements common to those of the first embodiment, and constituent elements which differ in layout position from the corresponding ones of the first embodiment are denoted by reference numerals to each of which "1" is prefixed.

In the second embodiment, an IG meter 158 is disposed at a position which is approximately superposed on the coil part 16 and the magnet part 3 which constitute one of the shift actuators, as viewed in the direction of the optical axis. Incidentally, even if the IG meter 158 is disposed at that position, the opening shape of the iris can be made similar to that of the aforesaid iris used in the first embodiment (refer to FIGS. 6(A) and 6(B)).

Since the IG meter 158 is disposed at the above-described position, the position of a focusing-driving stepping motor 159 can be shifted forwardly in the direction of the optical axis as compared with the fixed frame 1, as shown in FIG. 7(B). In other words, since the IG meter 158 is shifted to a position different from the position of the focusing-driving stepping motor 59 incorporated in the first embodiment, the output shaft of the focusing-driving stepping motor 159 can be extended into the position of the IG meter 158 in the direction of the optical axis.

The adoption of this layout makes it possible to dispose the focusing-driving stepping motor 159 forwardly from the image forming plane 306, thereby realizing a zoom lens barrel which is more compact in the direction of the optical axis than the zoom lens barrel according to the first embodiment.

Figure 8A:
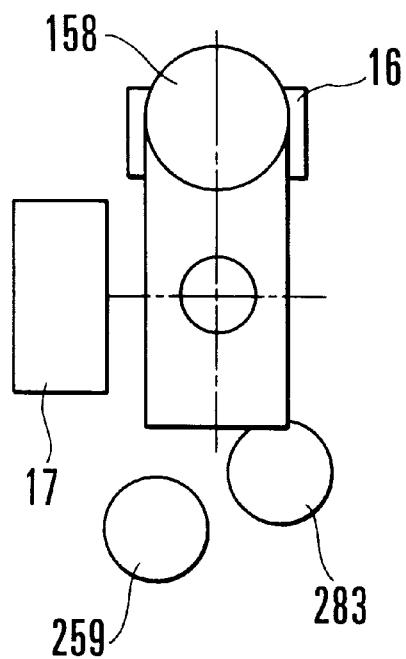
FIGS. 8(A) and 8(B) are layout views of actuators of a zoom lens barrel according to a third embodiment of the present invention.
Figure 8B:
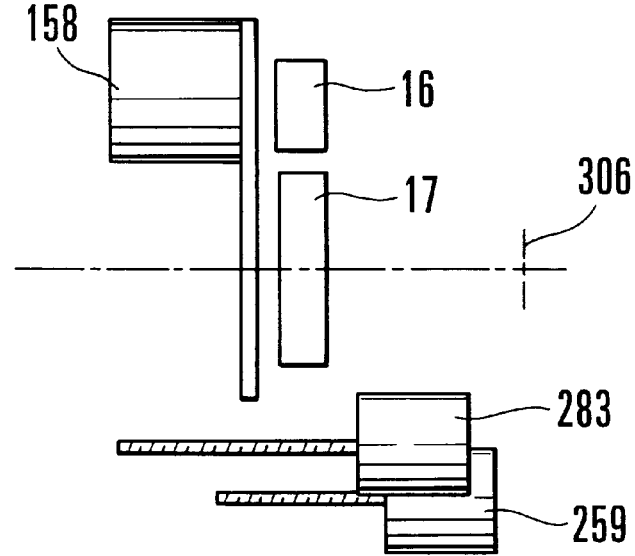
Figure 9A:
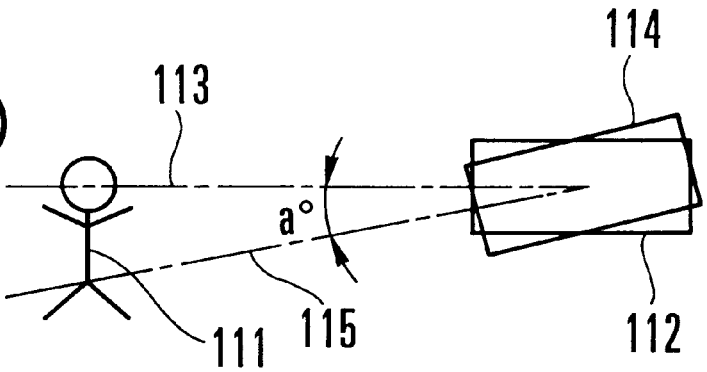
FIGS. 9(A), 9(B) and 9(C) are views aiding in describing the relation between the focal length and the vibration angle of a conventional camera in the form of the position of a subject in a picture.
Figure 9B:
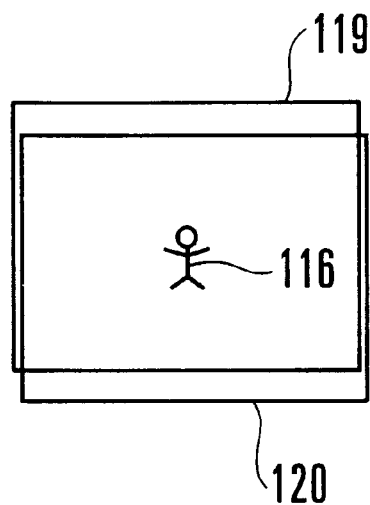
Figure 9C:
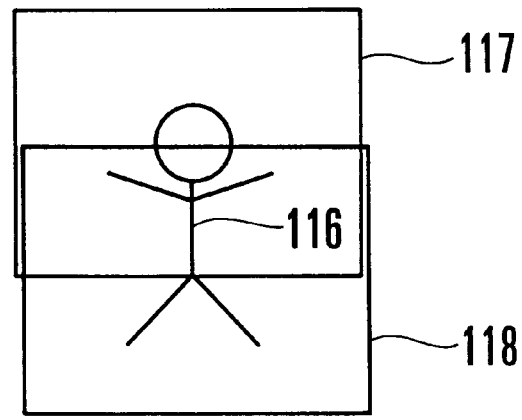
Figure 10A:
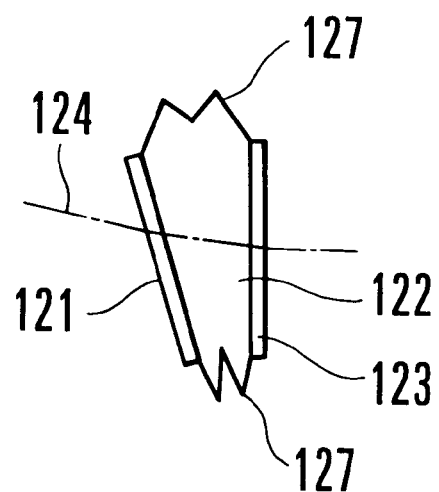
FIGS. 10(A), 10(B) and 10(C) are explanatory views of image-shake correction means of the conventional camera.
Figure 10B:
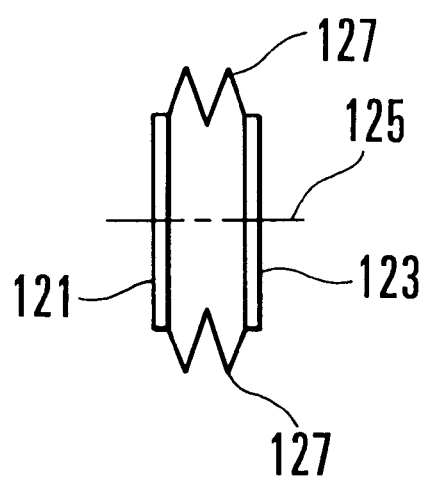
Figure 10C:
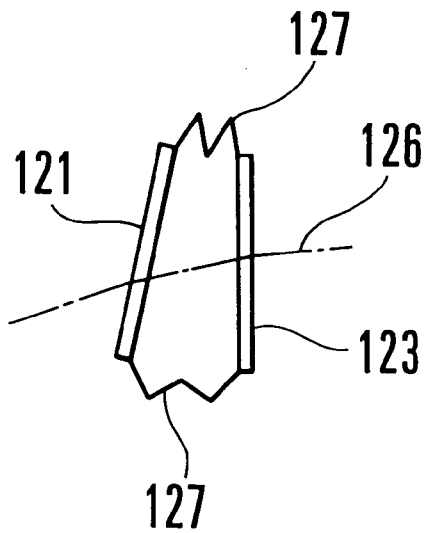
Figure 11A:
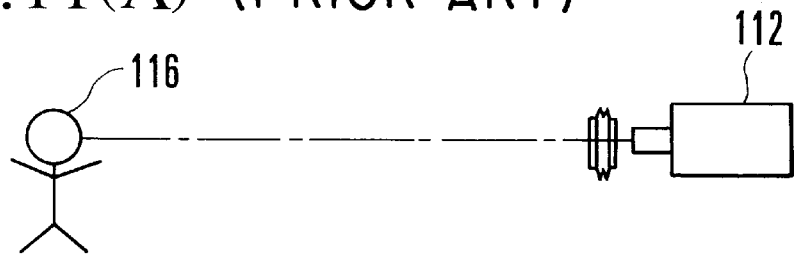
FIGS. 11(A) and 11(B) are explanatory views of the operation of the image-shake correction means of the conventional camera.
Figure 11B:
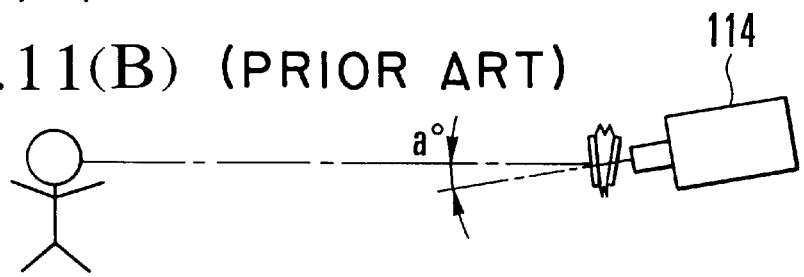
Figure 12:
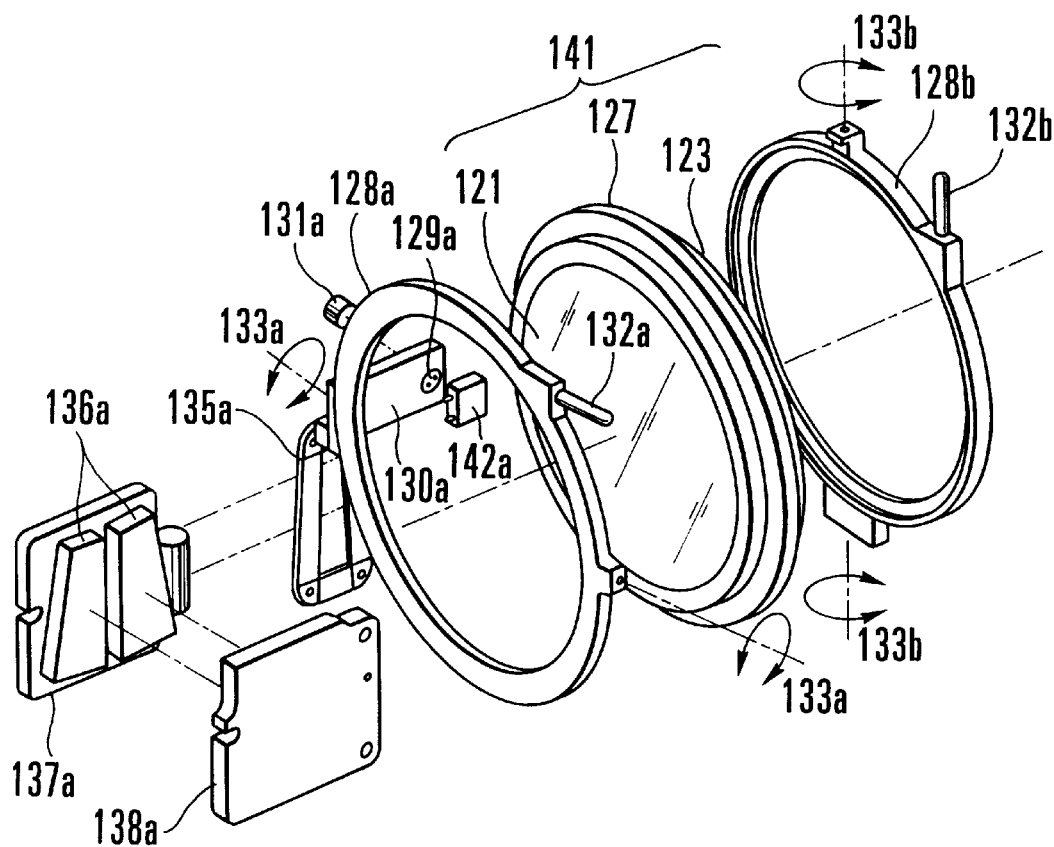
FIG. 12 is a diagrammatic exploded perspective view of the image-shake correction means of the conventional camera.
Figure 13:
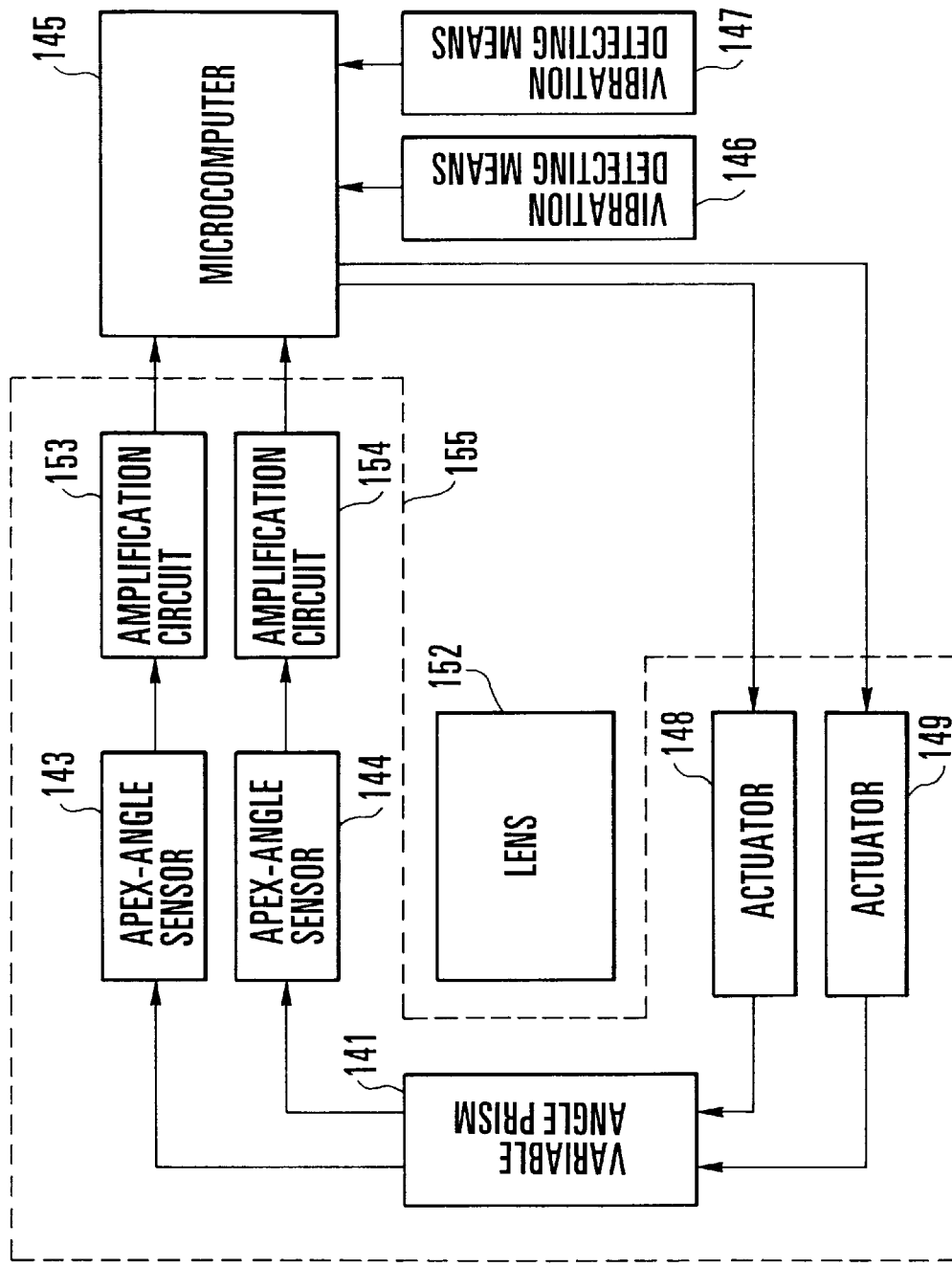
FIG. 13 is a block diagram of the image-shake correction means of the conventional camera.
Figure 14A:
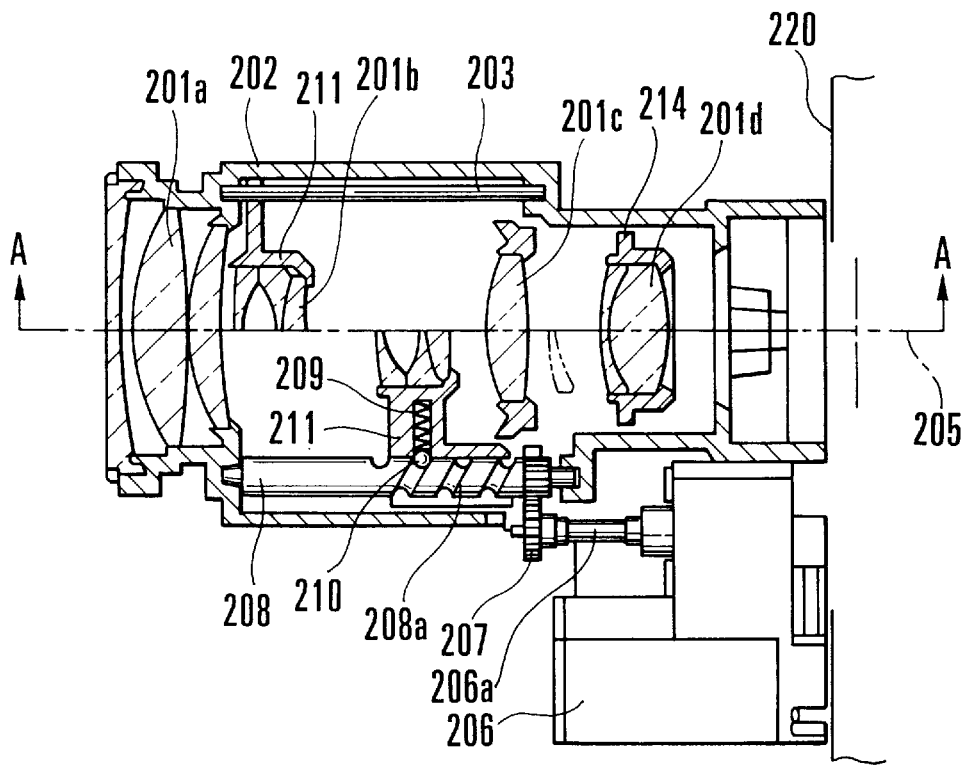
FIGS. 14(A) and 14(B) are diagrammatic cross-sectional views of a conventional zoom lens barrel.
Figure 14B:
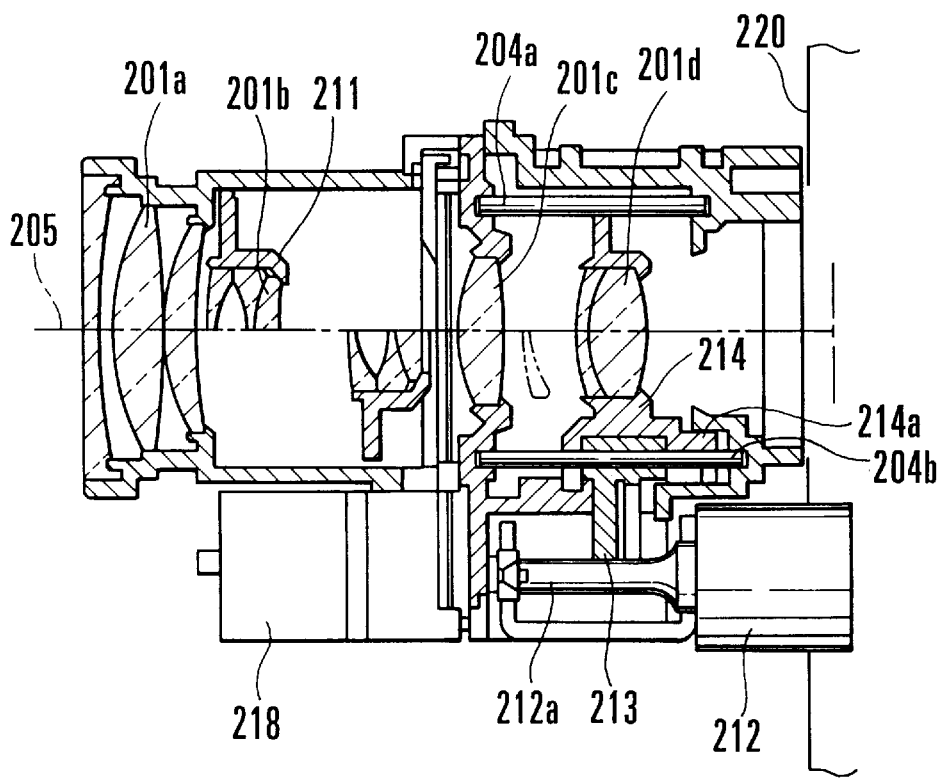

FIGS. 8(A) and 8(B) show a zoom lens barrel according to a third embodiment of the present invention. Incidentally, since the basic arrangement of the third embodiment is common to that of each of the first and second embodiments, common reference numerals are used to denote constituent elements common to those of the first and second embodiments and constituent elements which differ in layout position from the corresponding ones of the first or second embodiment are denoted by reference numerals to each of which 2 is prefixed.

In the third embodiment, similarly to the second embodiment, the IG meter 158 is disposed at a position which is approximately superposed on the coil part 16 and the magnet part 3 as viewed in the direction of the optical axis. In addition, a variator-driving stepping motor 283 and a focusing-driving stepping motor 259 are respectively disposed at positions approximately opposite to the layout positions of the IG meter 158 and the coil part 16 with respect to the optical axis.

With the adoption of this layout, not only is it possible to dispose the focusing-driving stepping motor 259 forwardly from the image forming plane 306 similarly to the layout of the second embodiment, but it is also possible to realize a zoom lens barrel which is smaller in lateral width than the zoom lens barrel according to either of the first and second embodiments.

Although, in each of the first to third embodiments, stepping motors are used as the variator-driving motor and the focusing-driving motor, motors other than the stepping motors may also be used.

In practical use, any of the above-described zoom lens barrels according to the first to third embodiments can be mounted to various kinds of image pickup apparatus such as video cameras and still cameras.

As is apparent from the foregoing description, in accordance with a first aspect of the present invention, since a guide bar is disposed to extend through a recess portion which is formed in a shift unit, the guide bar can be disposed at a position as close to the optical axis as possible, whereby the radial size of the lens barrel can be reduced.

In accordance with a second aspect of the present invention, holding positions at which a movable member is held are provided in a fixed member of a shift unit at three or more locations spaced at intervals of an equal angle about an optical axis, and a lens-barrel driving actuator is disposed in an area other than the holding positions as viewed in the direction of the optical axis. Accordingly, it is possible to hold the movable member of the shift unit uniformly and with high accuracy, and it is possible to realize an efficient layout of the actuator.

In accordance with a third aspect of the present invention, since a meshing portion of a rack member of a movable lens is positioned in the recess portion formed in the shift unit, as viewed in the direction of the optical axis, the rack member (the meshing portion) can be disposed at a position as close to the optical axis as possible, whereby the radial size of the lens barrel can be reduced. In addition, the rack member can be meshed with a screw shaft over a long range in the direction of the optical axis without interfering with the shift unit, whereby it is possible to ensure stable movement of the movable lens in the direction of the optical axis.

In accordance with a fourth aspect of the present invention, since a hole portion into which to insert a projecting portion formed on the movable lens in the direction of the optical axis is formed in the shift unit, the projecting portion can be prevented from interfering with the shift unit when the movable lens moves closer to the shift unit. Accordingly, the moving end of the movable lens can be made close to the shift unit, and a large magnification variation ratio and the like can be obtained even in a lens barrel of reduced size.

In accordance with a fifth aspect of the present invention, a shift actuator and position detecting means are disposed at a position where the shift actuator and the position detecting means are at least partly superposed on each other as viewed in the direction of the optical axis, whereby the external diametrical size of the shift unit can be particularly reduced.

In accordance with a sixth aspect of the present invention, since a holding member which holds a detecting element is secured to a yoke in the shift unit, the required number of component parts of the shift unit can be reduced and the size of the shift unit and hence the entire size of the lens barrel can be reduced.

In accordance with a seventh aspect of the present invention, a movable-lens actuator and an iris actuator are disposed in an area on a side of the optical axis opposite to an area in which the shift actuator is disposed, as viewed in the direction of the optical axis, and the movable-lens actuator and the iris actuator are disposed at a position where the movable-lens actuator and the iris actuator are at least partly superposed on each other as viewed in the direction of the optical axis. Accordingly, each of the actuators can be disposed in the lens barrel in an efficient and well-balanced manner, whereby the size of the lens barrel can be reduced.

In accordance with an eighth aspect of the present invention, the movable-lens actuator is disposed in an area on a side of the optical axis opposite to an area in which the shift actuator is disposed, as viewed in the direction of the optical axis, and the iris actuator and the shift actuator are disposed at a position where the iris actuator and the shift actuator are approximately superposed on each other as viewed in the direction of the optical axis. Similarly to the seventh aspect of the present invention, the radial size of the lens barrel can be reduced, and the movable-lens actuator can be transferred forwardly in the direction of the optical axis so as not to project rearwardly from an image forming plane in the direction of the optical axis.

In the eighth aspect of the present invention, it is possible to make the lens barrel thin by disposing the movable-lens actuator at a position on a side of the optical axis opposite to a position in which the iris actuator is disposed, as viewed in the direction of the optical axis.

We claim:

1. A lens barrel comprising:
    a guide bar which guides a first lens unit in a direction of an optical axis;
    a shift unit which shifts a second lens in a direction perpendicular to the optical axis; and
    a recess portion which is formed in a member which constitutes part of said shift unit, in such a manner as to recede in the direction perpendicular to the optical axis, said guide bar being passed through said recess portion.

2. A lens barrel according to claim 1, wherein said first lens has a pair of lens units disposed on opposite sides of said shift unit in the direction of the optical axis.

3. A lens barrel according to claim 2, wherein one of said pair of lens units is a magnification varying lens unit and the other is a focusing lens unit.

4. A lens barrel comprising:
    a movable member which moves while holding a lens; and
    a fixed member which is fixed to a lens barrel body and holds said movable member for movement in a direction perpendicular to an optical axis,
    holding positions at which said movable member are held being provided in said fixed member at three or more locations spaced at intervals of an equal angle about the optical axis, and an actuator providing actuation alone said optical axis being disposed in an area other than the holding positions as viewed in the direction of the optical axis.

5. A lens barrel according to claim 4, wherein said actuator includes at least one of an actuator for driving an iris, an actuator for driving a variator lens unit, and an actuator for driving a focusing lens unit.

6. A lens barrel comprising:

a rack member which is secured to a first lens unit and which meshes with a screw shaft extending in a direction of an optical axis and generates a driving force in the direction of the optical axis;

a shift unit which moves a second lens in a direction perpendicular to the optical axis; and a recess portion which is formed in a member which constitutes part of said shift unit, in such a manner as to recede in the direction perpendicular to the optical axis, a meshing portion of said rack member being positioned in said recess portion as viewed in the direction of the optical axis.

7. A lens barrel comprising:

a first lens which moves in a direction of an optical axis;

a shift unit which moves a second lens in a direction perpendicular to the optical axis; and a projecting portion formed on a holding member for said first lens at a position opposed to said shift unit in the direction of the optical axis, in such a manner as to project in the direction of the optical axis, a hole portion into which said projecting portion is inserted being formed in said shift unit.

8. A lens barrel according to claim 7, wherein said projecting means is light blocking means which blocks detection light for detecting a moving position of said first lens.

9. A lens barrel comprising:

a shift unit which moves a lens in a direction perpendicular to an optical axis, said shift unit including:

an actuator which drives the lens; and position detecting means which provides an output signal indicative of a position of the lens, said actuator and said position detecting means being disposed at a position where said actuator and said position detecting means are at least partly superposed on each other as viewed in the direction of the optical axis.

10. A lens barrel comprising:

a shift unit which moves a lens in a direction perpendicular to an optical axis, said shift unit including:

a coil and a yoke for driving the lens by magnetic force;

a detecting element providing an output signal indicative of a position of the lens; and a holding member which holds said detecting element adjacent one side of said coil, said holding member being secured to said yoke.

11. A lens barrel comprising:

a first actuator which moves a first lens in a direction of an optical axis;

a third actuator which drives an iris; and a second actuator which drives a second lens in a direction perpendicular to the optical axis, said first actuator and said third actuator being disposed in an area on a side of the optical axis opposite to an area in which said second actuator is disposed, as viewed in the direction of the optical axis, and said first actuator and said third actuator being disposed at a position where said first actuator and said third actuator are at least partly superposed on each other as viewed in the direction of the optical axis.

12. A lens barrel comprising:

a first actuator which moves a first lens in a direction of an optical axis;

a third actuator which drives an iris; and a second actuator which drives a second lens in a direction perpendicular to the optical axis, said first actuator being disposed in an area on a side of the optical axis opposite to an area in which said second actuator is disposed, as viewed in the direction of the optical axis, said third actuator and said second actuator being disposed at a position where said third actuator and said second actuator are approximately superposed on each other as viewed in the direction of the optical axis, said first actuator being disposed forwardly from an image forming plane in the direction of the optical axis.

13. A lens barrel according to claim 12, wherein said first actuator is disposed at a position on a side of the optical axis opposite to a position where said third actuator is disposed, as viewed in the direction of the optical axis.

14. An image pickup apparatus comprising a lens barrel according to one of claims 1 through 13.

15. A lens barrel comprising:

a guide bar which guides a first lens unit in a direction of an optical axis;

a shift unit which shifts a second lens unit in a direction perpendicular to the optical axis;

wherein said shift unit is provided with a recess portion to avoid said guide bar.

16. A lens barrel according to claim 15, wherein said first lens unit moves along the optical axis to perform zooming.

17. A lens barrel according to claim 15, wherein said first lens unit moves along the optical axis to perform focusing.

* * * * *

UNITED STATES PATENT AND TRADEMARK OFFICE
CERTIFICATE OF CORRECTION

PATENT NO. : 6,091,900
DATED : July 18, 2000
INVENTOR(S) : Naoya Kaneda et al.

It is certified that error appears in the above-identified patent and that said Letters Patent is hereby corrected as shown below:

<u>Column 4,</u>
Line 17, delete "degrees differ from" and insert -- degrees from --.

<u>Column 16,</u>
Line 60, delete "alone" and insert -- along --.

Signed and Sealed this

Fourth Day of December, 2001

Attest:

*Nicholas P. Godici*

NICHOLAS P. GODICI
*Attesting Officer*   *Acting Director of the United States Patent and Trademark Office*